(12) United States Patent
Pinchen et al.

(10) Patent No.: US 8,297,521 B2
(45) Date of Patent: Oct. 30, 2012

(54) TWO PART CODE

(75) Inventors: Stephen Paul Pinchen, Etwall (GB);
Jens Jacob Juul Rassmussen, Hellerup (DK)

(73) Assignee: Filtrona C&SP Limited, Nottingham (GB)

( * ) Notice: Subject to any disclaimer, the term of this patent is extended or adjusted under 35 U.S.C. 154(b) by 527 days.

(21) Appl. No.: 11/542,300

(22) Filed: Oct. 2, 2006

(65) Prior Publication Data

US 2007/0102519 A1    May 10, 2007

(30) Foreign Application Priority Data

Oct. 3, 2005 (GB) .................................. 0520065.4

(51) Int. Cl.
*G06K 19/06*   (2006.01)
(52) U.S. Cl. ....................................................... 235/494
(58) Field of Classification Search .................. 235/494, 235/462.01, 454
See application file for complete search history.

(56) References Cited

U.S. PATENT DOCUMENTS

| | | | | |
|---|---|---|---|---|
| 5,128,527 A | * | 7/1992 | Kawai et al. | 235/462.07 |
| 5,198,649 A | * | 3/1993 | Brooks | 235/462.12 |
| 5,367,148 A | | 11/1994 | Storch et al. | |
| 5,602,377 A | * | 2/1997 | Beller et al. | 235/462.15 |
| 5,979,762 A | * | 11/1999 | Bianco | 235/462.01 |
| 6,098,892 A | * | 8/2000 | Peoples, Jr. | 235/494 |
| 6,102,289 A | * | 8/2000 | Gabrielson | 235/462.01 |
| 6,158,660 A | * | 12/2000 | Blanford et al. | 235/462.11 |
| 6,357,656 B1 | | 3/2002 | Puff | |
| 6,456,729 B1 | | 9/2002 | Moore | |
| 6,550,682 B2 | * | 4/2003 | Ashiura | 235/462.25 |
| 6,729,603 B1 | * | 5/2004 | McQueen et al. | 235/375 |
| 6,976,628 B2 | * | 12/2005 | Krupa | 235/462.08 |
| 7,108,170 B2 | * | 9/2006 | McQueen et al. | 235/375 |
| 7,185,824 B2 | * | 3/2007 | Hepworth et al. | 235/494 |
| 7,188,774 B2 | | 3/2007 | Pinchen et al. | |
| 7,207,481 B2 | * | 4/2007 | Barenburg et al. | 235/381 |
| 7,283,630 B1 | | 10/2007 | Doljack | |
| 7,299,975 B2 | * | 11/2007 | McQueen et al. | 235/375 |
| 2002/0149793 A1 | | 10/2002 | Hepworth et al. | |

(Continued)

FOREIGN PATENT DOCUMENTS

EP    0889448 A2    1/1999

(Continued)

OTHER PUBLICATIONS

European Search Report, Application No. EP 06 25 5116, dated Jan. 8, 2007.

*Primary Examiner* — Michael G Lee
*Assistant Examiner* — Sueza Ellis
(74) *Attorney, Agent, or Firm* — Banner & Witcoff, Ltd.

(57) ABSTRACT

A code system for associating data with articles having codes each code having a uniquely created, non-informational first part and a second part wherein each code is associated with an article and the first part may be transformed and thereby uniquely associated with an individual article and a second part may be associated with the first part, such that a relationship between the parts, or lack thereof may be discerned by reading both parts of the code, in order to verify the authenticity of the code.

6 Claims, 3 Drawing Sheets

U.S. PATENT DOCUMENTS

| | | | |
|---|---|---|---|
| 2003/0121984 A1* | 7/2003 | Pinchen et al. | 235/487 |
| 2004/0174043 A1 | 9/2004 | Bradsen et al. | |
| 2005/0082376 A1* | 4/2005 | Lubow et al. | 235/494 |
| 2005/0199723 A1 | 9/2005 | Lubow | |
| 2005/0199724 A1 | 9/2005 | Lubow | |
| 2006/0015518 A1* | 1/2006 | Eletreby et al. | 707/101 |
| 2006/0095778 A1 | 5/2006 | He et al. | |
| 2007/0145142 A1 | 6/2007 | Lubow et al. | |
| 2008/0121688 A1* | 5/2008 | Harrop | 235/375 |
| 2008/0185438 A1 | 8/2008 | Pinchen et al. | |

FOREIGN PATENT DOCUMENTS

| | | |
|---|---|---|
| EP | 0889448 A2 | 1/1999 |
| EP | 1318486 | 6/2003 |
| EP | 1318486 A1 | 6/2003 |
| EP | WO 03038738 | 8/2003 |
| GB | 2 383 878 A | 7/2003 |
| WO | 03 038738 A1 | 5/2003 |
| WO | 2005104008 | 11/2005 |
| WO | WO2005104008 A1 | 11/2005 |

* cited by examiner

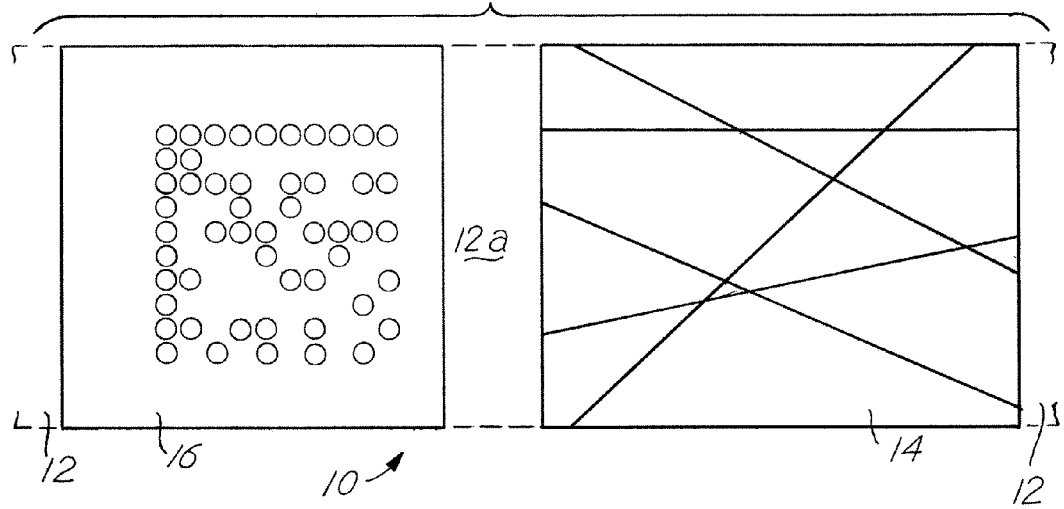
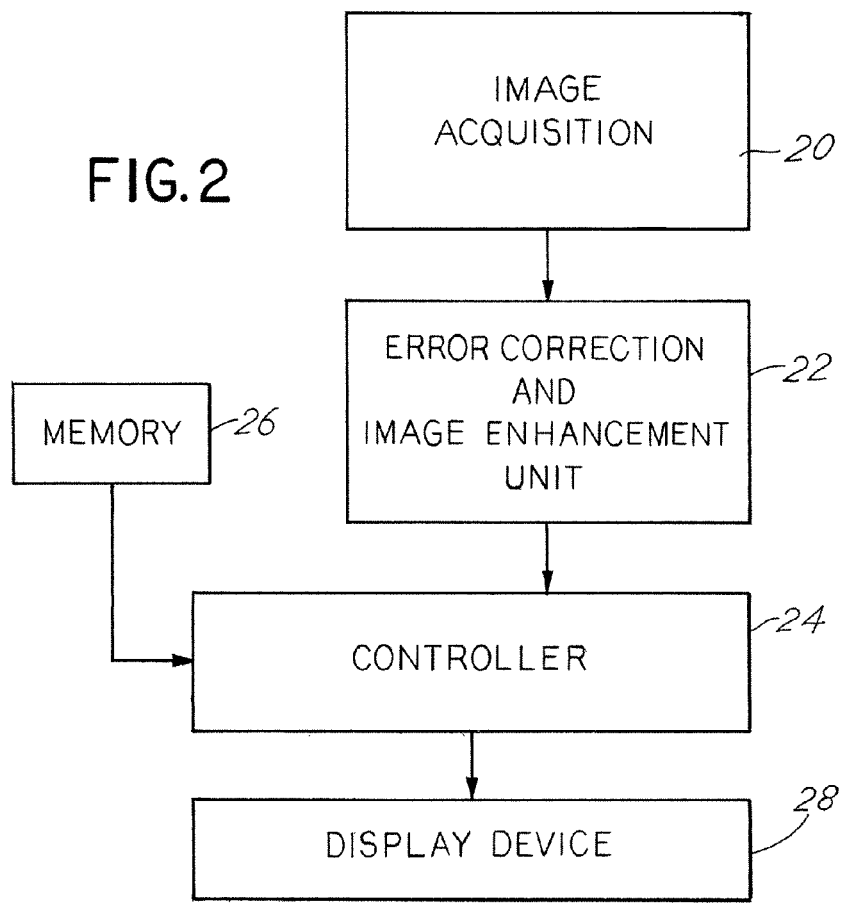

TWO PART CODE

CROSS REFERENCE TO RELATED APPLICATION

This is a National filing of a corresponding co-pending application filed in the United Kingdom as U.K. Serial No. GB05200654, filed Oct. 3, 2005, entitled "Two Part Code" for which priority is claimed and which is incorporated herein by reference.

BACKGROUND OF THE INVENTION

The present invention relates to codes and is concerned particularly with codes having two parts, which two parts are related.

Graphic, machine-readable codes are commonly used, for example, to identify articles such as consumer products. Several popular codes are currently used, including one and two-dimensional barcodes and matrix-style codes. In each case the code is applied to an article and enables the article to convey information about itself such as the identity of the manufacturer, and the article type.

One sophisticated type of machine readable code is described in our UK Patent No. GB 2383878 (the entire contents of which are incorporated herein by reference) and commercially available under the trade mark FractureCode®. Advantages of this type of code over other commercial machine-readable codes include a very high population of possible distinct codes as well as the ability to generate unique codes at very high speed.

Articles, such as consumer products or their packaging, are marked with such codes. In order to obtain information about the article, the code must be read by a machine which first performs a scanning operation to acquire digitally an image of the code. The image is then processed electronically to derive, via application of an algorithm, an alphanumeric character string that may be used to look up data corresponding to the article in a database.

Another major advantage of this code is the difficulty with which the code may be copied. The code, which typically comprises a rectangular box delimiting a series of intersecting lines, is difficult to copy to the degree of accuracy needed such that when read by a machine the same alphanumeric character string would be generated. This feature is partly a function of the level of detail, including thicknesses of lines and accuracy of angles therebetween, at which the scanning equipment acquires the image during reading. A further difficulty for would-be counterfeiters, is that many of the codes used are no more than 1 mm by 1 mm in area and may be printed in ultraviolet inks, infrared inks or other security inks.

A major security advantage of such codes is the fact that at the time of their creation they carry no information whatsoever, but must be scanned, converted into an alphanumeric character string using the algorithm and then related to data held in a database. Only then do they become meaningful.

Thus, without the algorithm, there is no way of deriving the information. A corresponding benefit is that even if a code can be reproduced accurately it cannot be applied to a different product from that to which it was originally applied without this fact becoming immediately detectable by a person undertaking a legitimate scanning/lookup operation.

SUMMARY OF THE INVENTION

Embodiments of the present invention aim to provide a machine-readable code for associating data with articles, the authenticity of which code may be verified without obtaining the article data with which the code is associated.

Embodiments of the invention also aim to provide a code, for associating articles with data stored in a database, in which the data may be obtained at a faster rate than has previously been possible.

In accordance with one aspect of the present invention there is provided a graphically representable, machine readable code having first and second parts wherein a first part may be associated with data and a second part may be associated with the first part, such that a relationship between the parts, or lack thereof, may be discerned by reading both parts of the code, in order to verify the authenticity of the code.

The invention also includes a method of verifying the authenticity or lack of authenticity of a graphically representable machine readable code, wherein the code comprises a first part and a second part, the method comprising reading both the first part and the second part of the code and determining whether the two parts of the code are related, and verifying that the code is authentic in the event that the two parts are related, or verifying that the code is not authentic in the event that the two parts are not related.

The invention also includes a code system for associating data with articles, the system comprising means for generating graphic codes for application to articles, machine means for reading the codes to convert each code into a string of characters, and storage means arranged to store data associated with each code, wherein the codes each comprise a first part and a second part, wherein said system includes a population N of codes having, within said population, unique first parts, and wherein within the system a population n of the codes has unique second parts, wherein N>n, and wherein for each code the first portion and the second portion are related, such that a number N/n of codes share the same second parts but have unique first parts.

Preferably the relationship between the first and second parts of the codes is detectable by a machine reading both parts and performing a mathematical operation on the two parts to discern whether they are related.

N/n codes, having distinct first parts N share common second parts n. Upon reading of both parts of the code it is possible to determine whether, for that particular code, the first part is one of the set of first parts that has the relationship with the read second part. If the parts are related this suggests that the code may be genuine. If the parts are unrelated then the code is definitely unauthentic.

The relationship between the first and second parts of the codes is preferably a function of the generation process by which the first parts were created. For example, the second part of the code may represent one or more characteristics of a batch of first parts such as a relationship between intersecting lines, which is common to all of the first parts in that particular batch of codes.

Thus, provided that future machine-reading of the two portions of the code is performed in a consistent, approved manner, it is possible to detect a mismatch between the first and second parts which mismatch would suggest an unauthorized or counterfeit code.

In another aspect the invention provides a method of looking up a code in a database to determine data associated with the code, wherein the code comprises first and second parts (F and S) wherein the first part (F) is associated with data in the database and is one of a set N of such first parts, and the second part is related to the first part and is one of a set n of such second parts, N being much greater than n, the method comprising looking up in the database the second part (S) of the code among the population n, and then looking up the first part (P) of the code within the subset N/n of first parts which share the same second part (S).

Since each code has a second part which belongs in set n, and since each individual second part has associated with it a large number of first parts, the unique codes may be grouped together in a database according to their shared second parts. Codes can thus be identified in a database by first looking for the subset of codes that has the shared common second part and then searching within the range n for the unique first part. This can speed up the search as compared with searching the entire population N.

The invention also includes any combination of the features and limitations herein, except combinations of such features as are mutually exclusive.

BRIEF DESCRIPTION OF THE DRAWING

A preferred embodiment of the present invention will now be described with reference to the accompanying diagrammatic drawings in which:

FIG. 1 shows a two-part code, in accordance with an embodiment of the invention, FIG. 2 shows schematically a reader apparatus for reading two-part codes.

DETAILED DESCRIPTION OF EMBODIMENTS OF THE INVENTION

Figure 3:
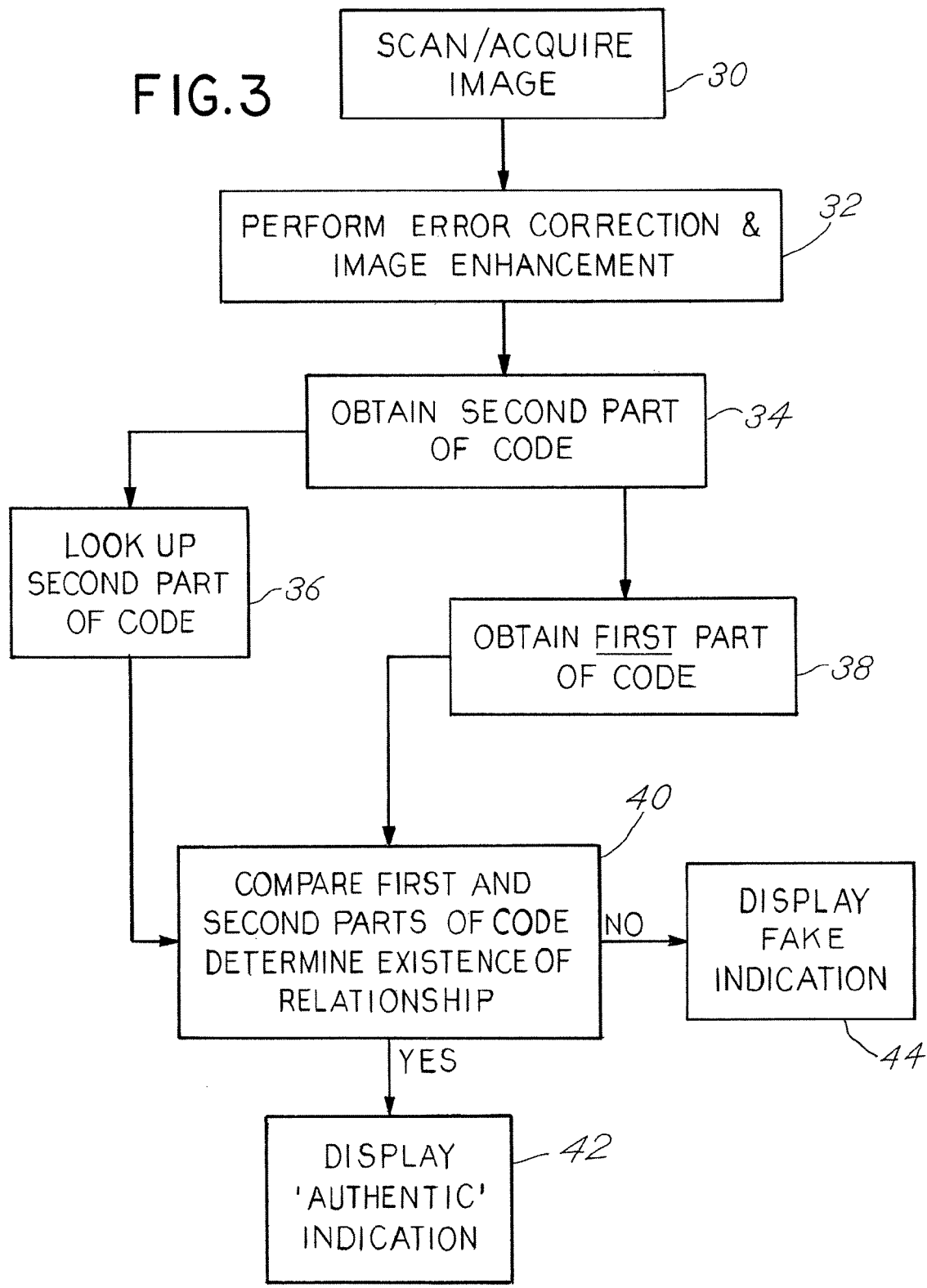
FIG. 3 is a flow diagram depicting a reading operation of the apparatus of FIG. 2.

Turning to FIG. 1, this shows generally at 10 a two-part code printed on a substrate 12. The two-part code 10 comprises a first part 14 and a second part 16 which are separated by a portion 12a of the substrate 12. In this case the first part 14 occupies a first, generally rectangular area and the second part 16 occupies a second, smaller generally rectangular area. The relative sizes of the first and second areas, and/or their shape, could be different from the example shown.

Inside the area occupied by the first part 14 is a plurality of straight lines, at least some of which intersect each other. In this example the first part of the two-part code comprises a composite indicium such as is described in our UK Patent No. GB 2383878 B and sold commercially under the trade mark FractureCode® and for which there is currently a co-pending U.S. application Ser. No. 10/313,185. Whilst the example is of a plurality of intersecting lines, this type of code might comprise other elements or shapes such as dots, rectangles or ellipses or a combination of such elements and/or shapes.

In the example, the second part of the code comprises a two dimensional bar code such as a data matrix code. In practice the second part of the code could be almost any of the currently known codes referred to collectively as "bar codes" and including, but not limited to such codes as: Data Matrix, PDF-417, Micro-PDF-417, QR Code, EAN, MaxiCode, Codabar, RSS, UPC and Interleaved 2 of 5.

Codes of the type used for the first part have a very high population of unique individuals. That is to say that a very large number of unique composite indicia, each being convertible using an algorithm into a unique alphanumeric character string, exists. Codes of the type used for the second part typically have a much lower population of unique individuals. Both first and second parts of the two-part code may be printed on the substrate, using either conventional inks or covert inks, such as are detectable only when illuminated, or irradiated, with light of a certain frequency range.

FIG. 2 shows, schematically, a hand-held reading apparatus for reading the two-part codes 10. An image acquisition device 20, which includes a camera (not shown) is used to acquire an image of the code being read. The acquired image is error-corrected and enhanced electronically in an error correction and image enhancement unit 22 before being fed to an electronic controller 24. The controller 24 applies algorithms to the first and second parts of the two-part code, to produce first and second respective character strings. The controller 24 then accesses a memory 26, in the form of a look-up table, to look up the second character string—i.e. the character string associated with the second part (16) of the two part code. From the look-up table in memory 26 the controller is then able to determine whether the first character string—i.e. of the first part of the two part code—is one of the many first parts which is associated with the second character string. In other words, by performing a look-up function and then comparing the first and second character strings obtained respectively from the first and second parts of the codes, the controller is able to verify whether the first part of the code (being a unique one among a very large population N) belongs to the sub-set of such first parts which is associated with the second part which has been read and is the subject of the look-up operation.

A display device 28 such as for example an LCD panel is used to provide an indication of the results, which might for example be a message indicating [AUTHENTIC] if the first and second parts are associated, or might be [FAKE] if the first and second parts are not associated.

The controller 24, memory 26 and display device 28 could be separate from the image acquisition device 20 and the unit 22, and may for example be constituted in a PC or PDA.

The UK patent referred to above describes one technique for deriving a character string from a composite indicium such as is used to form the first part of the code in accordance with an embodiment of the present invention. Minutiae of the composite indicium maybe associated with intersections of different oblique lines. The locations of the intersections relative to a reference feature, and optionally the angles between the intersecting lines and/or the thicknesses of certain of the lines, can all be processed to produce an alphanumeric character string. As stated above, a very large number, perhaps $10^{30}$ or more of unique composite indicia—i.e. first parts of the two-part code—may be created.

One or more characters in the string can be encoded and included in the second part of the code, so that upon decoding the second part of the code it is possible to tell quickly, by reference to a look up table, whether a particular first part "belongs" with the second part being considered.

Of course, the primary purpose of the two—part code is to carry information about the article with which it is associated. For example, the second part of the code may include information such as the name of the manufacturer and the type of product. The first part of the code which may have a unique character string associated therewith and may, when looked up in the database, yield far more information, such as the factory in which the article was manufactured, the date and time of manufacture and the intended destination, price and so on.

It will be appreciated that the first parts of the two part code are created first and then subsequently have data attributed to them in a database.

The second part of the code is created purposefully to include some identifiable characteristics of the first part. However, without applying the algorithm to the first part of the code the unique alphanumeric character string associated with it cannot be reproduced and hence the second part of the code cannot be designed to "match" the first part. Therefore, without possession of the algorithm it is not possible to produce an authorized two-part code in which the first and second parts are verifiably appropriately matched.

FIG. 3 shows schematically in a flow diagram a process for authenticating the two part code. At step 30, the two part code is scanned and an image (of both parts) is acquired. At step 32 a process of error correction and image enhancement is performed electronically. At step 34 the second part of the code is obtained and at step 36 the second part is looked up in a look-up table of a database. At step 38 the first part of the code is obtained using the appropriate algorithm and at step 40 a comparison of the first and second parts of the code is made to verify whether the two parts are associated. If the judgment is YES then at step 42 a positive indication is displayed such as [AUTHENTIC]. On the other hand, if the determination at step 40 is that the first and second parts of the code are not associated then at step 44 a negative indication, such as [FAKE] is displayed.

It will be appreciated that the apparatus and method described above are concerned only with determining whether or not the two-part code is authentic. However, the code itself is used mainly to access information about articles with which it is associated. In order to do so, a reference must be made to a large database which contains many unique alpha numeric character strings, each including information associated with an article.

The hand-held reader device of the present invention may include such a database, though such is not included in the embodiment described above. More likely is that the database will be located elsewhere and may, for example, be accessed remotely such as by using an internet or other network connection.

Since the database may contain a very large number of unique entries, comprising unique character strings derivable from respective unique first parts, the searching of the database may take considerable time. In order to lower the time taken to look up each unique entry, in accordance with an embodiment of the present invention a database, holding unique character strings derived from unique first parts of the two part code, groups the unique character strings in regions of the database according to their corresponding second part, which may be far fewer in number. Thus, when looking up a particular first part the look up process initially involves accessing that part of the database corresponding to the second part of the code. Then a search for the data associated with the unique character string derived from the unique first part of the code may be made among a far smaller number of such unique character strings.

Figure 4:
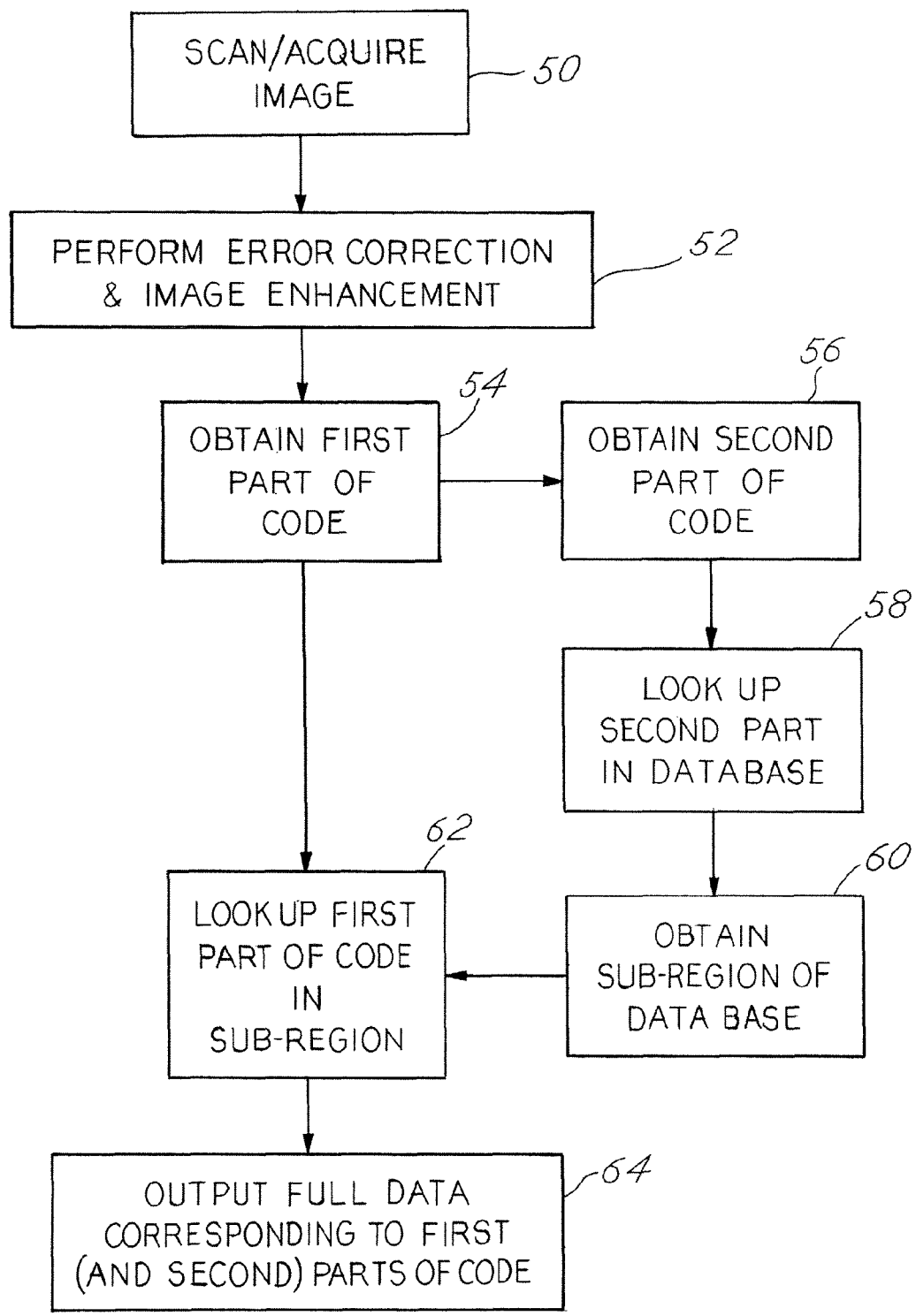
FIG. 4 is a flow diagram depicting a search process according to another embodiment of the present invention.

FIG. 4 shows schematically a look up method as a flow diagram. In a step 50 an image of both of the first and second parts of the two part code is scanned and electronically acquired. At step 52 the acquired image is error corrected and enhanced. At step 54 the first part of the code is obtained and at step 56 the second part is obtained. The second part of the code obtained at step 56 is then looked up in a main database at step 58 and the sub-region of the main database in which the second part is located is identified at step 60. At step 62 the first part of the code, obtained at step 54, is looked up in the sub-region of the database identified at step 60 and at step 64 the full data associated with the two part code is output to the user. This process is an order of magnitude faster than searching all of the first parts sequentially in the database.

While various embodiments of the invention have been disclosed, it is to be understood that the invention is not so limited and that the invention is limited only by the following claims and equivalents thereof.

The invention claimed is:

1. A code system for generating graphic codes for application to articles and for associating article information with said articles using said codes, the system comprising:
   an apparatus for generating a plurality of graphic codes for application to articles, each graphic code comprising a unique first graphic indicium that is not contrived to contain any information at the time of its creation, and a second part that is contrived to contain data;
   a reading machine for reading each said codes to convert the first part into a character string that characterizes said first part and the second part into the data that said second part contains; and
   a storage means, arranged to store for each code, (i) the data contained within the second part, (ii) the character string that characterizes the first part, and (iii) article information regarding the article to which the code is applied;
   wherein said system includes a population of codes, each code within said population having a unique first part;
   wherein within said population there are a plurality of subsets of codes each subset containing a plurality of codes
   the plurality of codes within each subset having the same second part but unique first parts; and
   wherein the second parts are different for different subsets.

2. A method of accessing a database of article information in a storage unit associated with a population of codes, wherein each other comprises first and second parts wherein the first part is comprised of a unique graphic indicium that is not contrived to contain any information at the time of its creation and that is transformable by machine reading into a unique string of characters that characterizes the first part and that is associated with article information data stored in the database, and a second part comprised of a machine readable graphic indicium that contains data; and
   wherein each code within said population having a unique first part, and wherein within said population there are a plurality of subsets of codes each containing a plurality of codes, the plurality of codes within each subset having the same second part but a said unique first part, and wherein the second parts are different for different subsets, the method comprising:
   accessing the database of said storage unit with a reading device to locate a subset of said population having the same second part, and then looking up the first part of the code within the subset of first parts which share the same second part.

3. A code processing system for associating article information with an article, said system comprising:
   a mechanism for creating and printing codes for said articles, each of said codes having a first part and a second part for application to a one of said articles, said first part of each code comprising a first unique created graphic indicium that is not contrived to contain any information at the time of creation, said second part comprising a second, graphic indicium that is contrived to contain data, wherein said system includes a population of codes, each code within said population having a unique first part, wherein within said population there are a plurality of subsets of codes each containing a plurality of codes, the plurality of codes within each subset having the same second part but unique first parts, and wherein the second parts are different for different subsets;
   a reading and converting apparatus for reading and transforming the first part of each code into a character string that characterizes said first part and the second part of each code into the data that said second part contains;

a storage apparatus for storing for each code, the data contained in the second part, the character string that characterizes the first part, and article information regarding the article to which the code is applied;

a controller for accessing said the data contained in the second part, the character string and the associated article information in the storage apparatus for said codes; and a display apparatus for displaying article information for said codes.

4. The system of claim 3 wherein said reading and converting apparatus employs an algorithm for converting said codes to an alpha numeric string of said characters.

5. A method for creating codes for application to articles and retrieving article information associated with articles having a code applied thereto from a storage unit comprising the steps of:

creating and applying a graphic indicium code from a population of codes to each of said articles, each said code of said population including a unique, machine readable, created graphic indicium first part that is not contrived to contain any information at the time of its creation and, and a graphic indicium second part that is contrived to contain data and that is unique within a subset of said population, wherein there are a plurality of subsets within said population, each subset containing a plurality of codes, the plurality of codes within each subset having the same second part but a unique first part and wherein the second parts are different for different subsets;

subsequently transforming the first part of each code to a character string that characterizes said first part by means of a reading and converting device; and storing for each code the data contained within the second part, the character string that characterizes the first part and article information to be associated with the said character strings in said storage unit for retrievable access thereof.

6. A system of generating graphic codes for application to articles and for associating article information with said articles using said codes, said system comprising:

storage means capable of storage of article information for said articles;

apparatus for generating graphic codes for application to said articles, each of said codes comprising a first part and a second part, each said first part comprising a first unique indicium which is not contrived to contain any information at the time of the creation of said first indicium and each said second part comprising a second indicium that is contrived to contain data; and machine means characterized by a capability to read each said first parts and convert each of said first parts to a string character which characterizes said first part and which are capable of storage by said storage means; and further the capability to read each associated second part and convert each second part to the data which said second part contains for storage by said storage means and for association of said codes with article information in said storage means;

wherein said system comprises a population of said codes, each said code within the population having a unique first part and, wherein the population is further comprised of a plurality of subsets of said codes, each subset containing a plurality of said codes having the same second part but a unique first part, and wherein the second parts are different for different subsets.

* * * * *